United States Patent [19]

Czech

[11] Patent Number: 4,515,298

[45] Date of Patent: May 7, 1985

[54] DISPENSER FOR PASTE-LIKE PRODUCTS WITH MANUALLY ACTUABLE PISTON INCLUDING INSERT DEVICE

[76] Inventor: Joachim Czech, Jahnstrasse 19, D-8405 Donaustauf, Fed. Rep. of Germany

[21] Appl. No.: 344,694

[22] Filed: Feb. 1, 1982

[51] Int. Cl.³ ............................................ G01F 11/02

[52] U.S. Cl. .................................... 222/380; 222/383

[58] Field of Search ........................ 222/321, 380, 383; 239/329, 331, 333

[56] References Cited

U.S. PATENT DOCUMENTS 3,527,551 9/1970 Kutik et al. .................... 222/380 X 4,301,948 11/1981 Czech et al. ....................... 222/341

4,396,132 8/1983 Christensen .................. 222/380 X

*Primary Examiner*—Joseph J. Rolla

*Assistant Examiner*—Frederick R. Handren

*Attorney, Agent, or Firm*—James E. Nilles

[57] ABSTRACT

This relates to a dispenser for paste-like products wherein there is a pump chamber disposed between a container for the product and a dispensing opening and the pump chamber and an adjacent duct have associated therewith flow control inlet and outlet valves. The principal feature resides in the provision of a separate insert which is telescoped between a container and a head member and which insert defines a pump cylinder and a discharge duct and carries and inlet valve element and an outlet valve element. The inlet valve element is integrally formed with the insert while the outlet valve element may be selectively formed integrally with the insert or as a separate insert which may be readily incorporated within the primary insert.

23 Claims, 8 Drawing Figures

FIG. 1
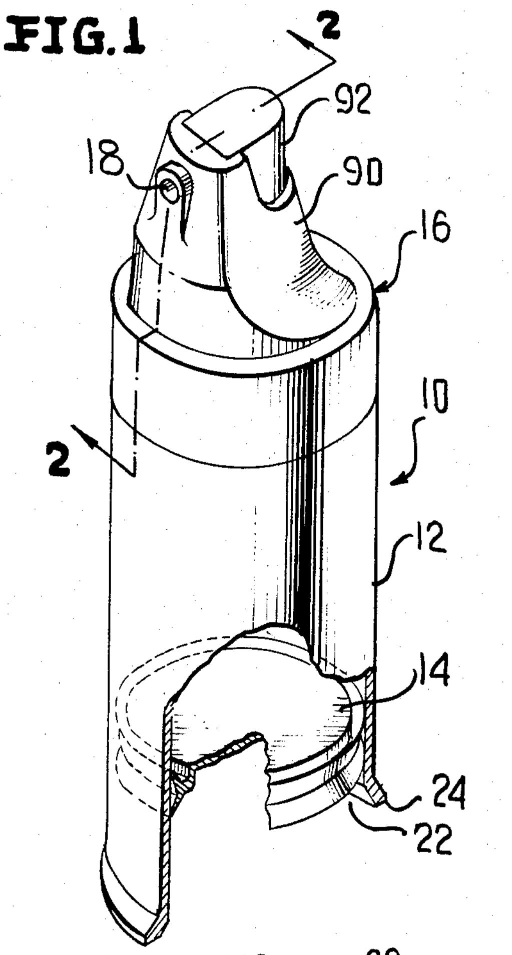
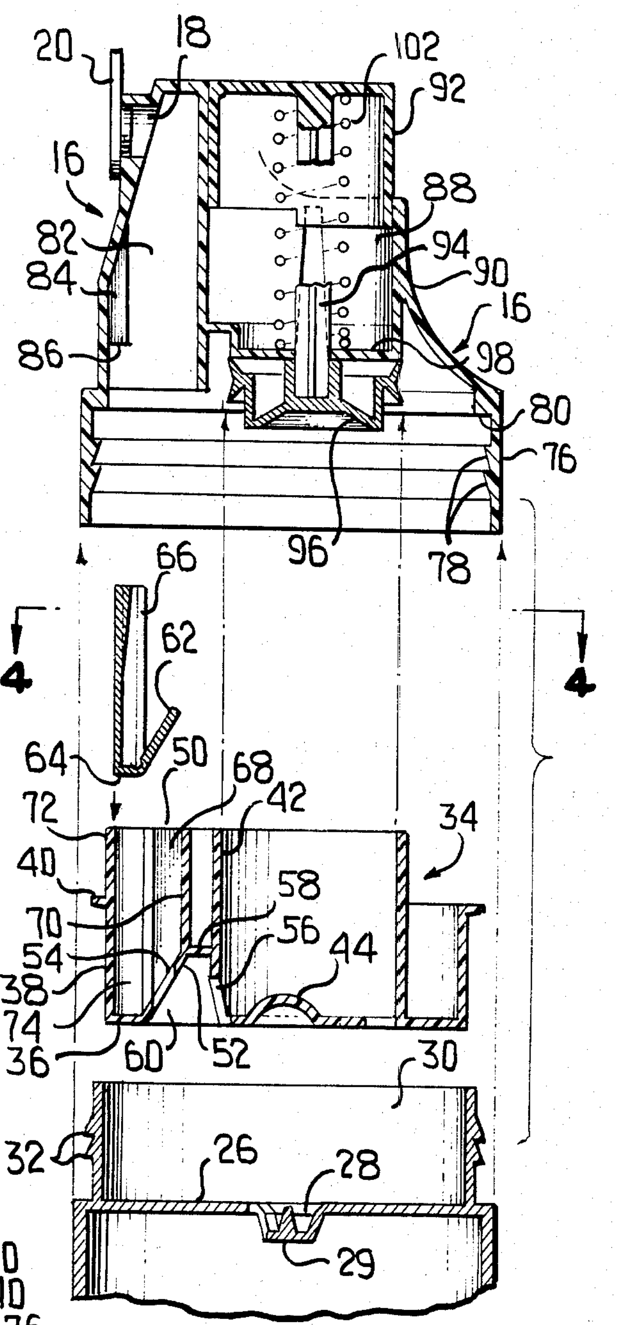
FIG. 3
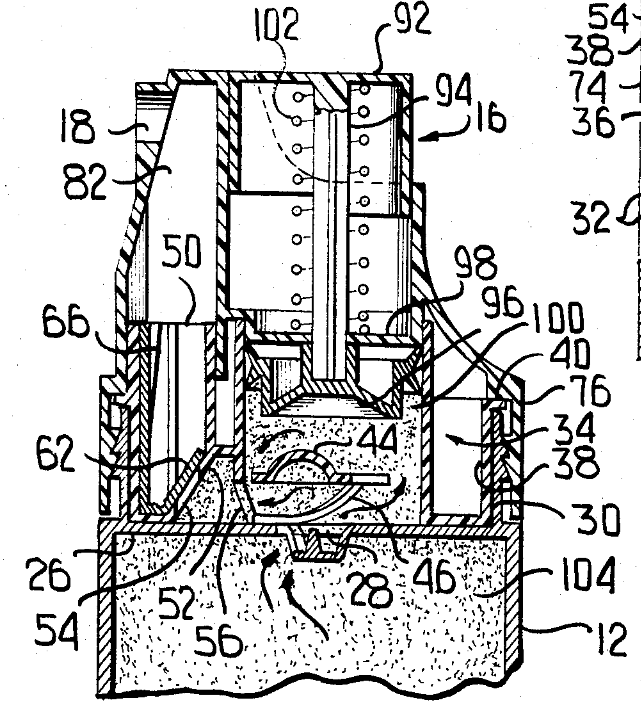
FIG. 2

DISPENSER FOR PASTE-LIKE PRODUCTS WITH MANUALLY ACTUABLE PISTON INCLUDING INSERT DEVICE

This invention relates to a dispenser for paste-like products and which is an improvement over the dispenser disclosed and claimed in U.S. Pat. No. 4,301,948, granted Nov. 24, 1981.

The dispenser differs from known prior art dispensers in the internal construction thereof, and more particularly in the provision of a separately formed insert member which defines a cylinder of a pump chamber and a discharge duct disposed in controlled communication with the pump chamber and carries inlet and outlet flow control valve elements.

In accordance with the invention, the insert is telescoped generally within and between a container and a head member with the insert opposing a transverse wall of the container, which wall has a supply opening therethrough through which product flow is controlled by the inlet valve element. The duct of the insert is in communication with an outlet duct of the head member and a piston is carried by the head member for exerting a pumping movement within the pump chamber.

The construction of the insert is preferably one wherein the inlet valve member is integral with the insert and the outlet valve member is a separately formed element which is readily positioned within the duct of the insert.

Preferably the insert includes a base and an upstanding cylindrical wall which is telescoped within a tubular extension of the container projecting longitudinally from the transverse wall, and the head member includes a tubular portion which is telescoped over the container extension and interlocked therewith to retain the insert in place.

The inlet valve element may either be in the form of a flap valve which is hingedly connected to a wall of the cylinder, or in the form of a valve element which is carried by a pair of spring arms for longitudinal movement. The outlet or discharge valve element is preferably in the form of a support member which is mounted within a guideway within the duct and which carries a hingedly mounted flap valve. It is, however, feasible that the outlet valve element be integrally formed with the insert.

With the above and other objects in view that will hereinafter appear, the nature of the invention will be more clearly understood by reference to the following detailed description, the appended claims, and the several views illustrated in the accompanying drawings.

IN THE DRAWINGS

FIG. 1 is a perspective view of a dispenser formed in accordance with this invention with a lower portion of the container broken away to show the details of a piston positioned therein.

FIG. 2 is an enlarged fragmentary longitudinal sectional view taken through the head member, the insert and the adjacent part of the container.

FIG. 3 is an enlarged exploded perspective view of the components of FIG. 2, and shows more specifically the details thereof.

Figure 4:
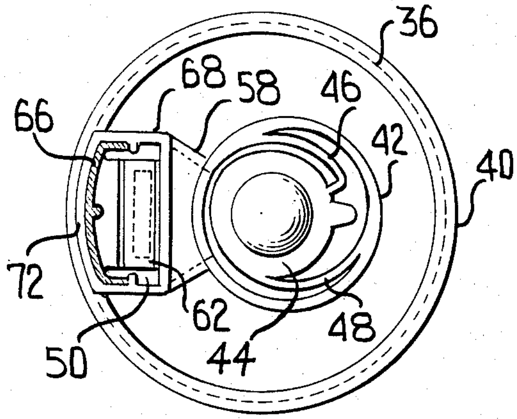
FIG. 4 is a horizontal sectional view taken generally along the line 4—4 of FIG. 3, and generally shows the details of the two flow control valve elements.

Referring now to the drawings in detail, it will be seen that there is illustrated in FIG. 1 a dispenser formed in accordance with this invention and generally identified by the numeral 10. The dispenser 10 includes a longitudinally elongated cylindrical container 12 which has freely slidable therein a slidable piston 14. The container 12 also carries a head member, generally identified by the numeral 16, which provides for the pumping actuation of the dispenser to dispense a product through a discharge opening 18 which is normally closed by a removable plug member 20 (FIG. 3).

Referring now to FIGS. 1 and 3, it will be seen that the container 12 has an open end 22 which is generally defined by an outwardly flared terminal portion 24 of the container 12. It will also be seen that remote from the open end 22 the container 12 is provided with a transverse wall 26 having a dispensing opening 28 therethrough which is generally protected by a guard member 29 which limits the movement of the slidable piston 14 toward the transverse wall 26.

It will also be seen that the container 12 includes a tubular extension 30 which extends longitudinally from the transverse wall 26 and is of a lesser diameter than the container 12. The tubular projection 30 is provided with annular ribs 32 on the external surface thereof for a purpose to be described hereinafter.

The dispenser 10 also includes a separately formed insert 34 which includes a base 36 and an upstanding cylindrical wall 38. The wall 38 is of a size snugly to be received within the tubular extension 30 and is provided with an external bead 40 which overlies the upper end of the extension 30 in the manner shown in FIG. 2. When the insert 34 is properly positioned within the extension 30, the base 36 seats on the transverse wall 26.

The insert 34 includes a centrally located pump cylinder 42 which extends upwardly from the base 36 and is generally aligned with the hole or opening 28. It will be apparent from FIG. 4 that the bottom of the cylinder 42 is open so that a product from within the container 12 may readily flow from the hole 28 into the cylinder 42 in the second half of a pumping operation as will be described hereinafter. In order that the flow from the cylinder 42 back into the container 12 through the hole 28 may be controlled, there is provided an inlet flow control valve element 44 at the bottom of the cylinder 42 in direct overlying relation to the transverse wall 26. Again referring to FIG. 4, it will be seen that the valve element 44 is generally circular in outline and is carried by a pair of arcuate resilient arms 46, 48 which have their outer ends integrally formed with the cylinder 42 at the base 36. The valve element 44, as shown in FIG. 3, is preferably of a centrally arched configuration so as to be relatively rigid. It is to be understood that the normal position of the valve element 44 is one engaging the transverse wall 26 and sealing the hole 28 but is free to move longitudinally upwardly into the cylinder 42 to permit flow of the product from the container 12 into the cylinder 42.

The insert 34 also defines an outflow or discharge duct 50 which is disposed adjacent to and parallel to the pump cylinder 42. The discharge duct has a sloping bottom wall 52 which together with the base 36 forms the bottom of the duct 50. The wall 52 has an inlet opening 54 formed therein with the inlet opening 54 being in communication with an outlet opening 56 formed in the bottom part of the cylinder 42. The wall 52 together with the cylinder 42 and a transverse wall portion 58 combine to define a passageway 60, in conjunction with the transverse wall 26 between the openings 56 and 54.

In the form of the invention illustrated in FIGS. 1–7, flow through the opening 54 is controlled by a flap valve 62 which is hingedly connected to a base 64 of a longitudinally elongated support 66. Two walls 68 of the duct 50 are provided with opposed ribs 70 which together with a radially outer wall 72 of the duct define longitudinally extending guideways 74 in which the support 66 is received and seated so that normally the outlet valve element 62 engages the wall 52 in overlying relation to the opening 54 to close that opening.

The head member 16 has a tubular base portion 76 which is telescoped over the tubular extension 30. The base portion 76 is provided with internal annular ribs 78 which interlock with the ribs 32 to retain the head member 16 on the container 12. At the upper end of the base 76 the head member has a radially inwardly directed shoulder 80 which abuts the flange 40 and holds the insert 34 with the base 36 tightly abutting the transverse wall 26.

At one side thereof, the upper part of the head member 16 is configurated to define a duct extension 82 which telescopes over the upper end of the duct 50 and forms a continuation thereof. The interior of the duct extension 82 is provided with a longitudinal rib 84 which defines an abutment shoulder 86 for engaging the upper end of the wall 72 of the duct 50 and the support 66 to retain the support 66 and the valve element 62 in the duct 50 as shown in FIG. 2. The previously mentioned discharge opening 18 opens out from the upper end of the duct extension 82.

An upper circular portion of the head member 16 includes a longitudinal guideway 88 which is defined by a wall configuration 90 best shown in FIG. 1. An actuator 92 is mounted in the guideway 88 for longitudinal movement and is provided with a piston rod 94 which carries on its lower end a pump piston 96 which is received in the pump cylinder 42. The lower end of the guideway 88 includes a transversely offset cylindrical wall portion 98 which is received in the upper end of the pump cylinder 42 and together therewith and together with the transverse wall 26 define a pump chamber 100. The piston 96 is received in the upper part of the pump chamber 100 and is normally retained in the upper part of the pump chamber and in abutment with the wall 98 by a spring member 102 which reacts against the actuator 92 and the wall 98 constantly to urge the actuator 92 to its uppermost position pulling the piston 96 up against the wall 98.

OPERATION

Figure 5:
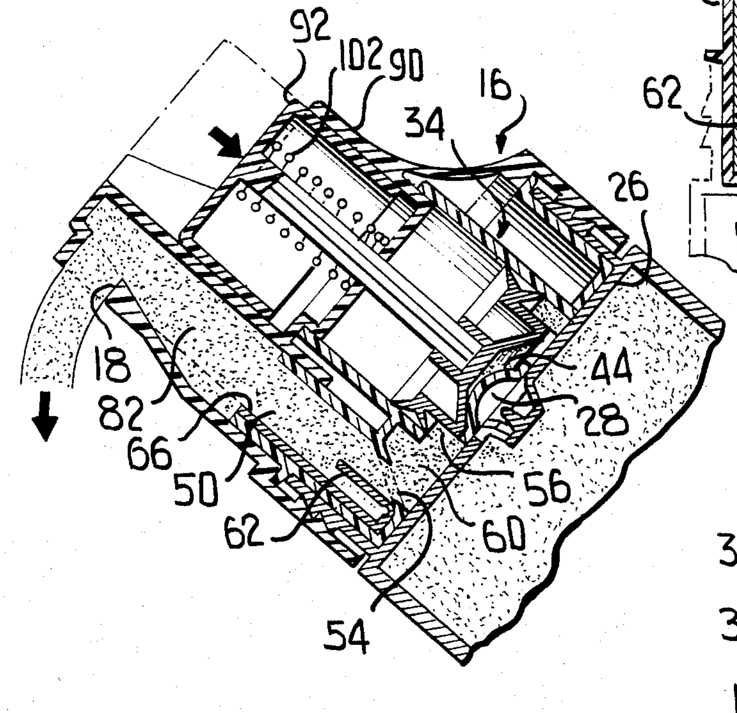
FIG. 5 is an enlarged fragmentary sectional view similar to FIG. 2, and shows the piston having been depressed with there being flow of the product out of the dispenser.

It is to be understood that after the components of the dispenser 10 have been assembled and prior to the insertion of the piston 14 into the container 12, the container 12 is filled with a paste-like product 104 which is to be dispensed. The piston 14 is then placed in the open end of the container 12 and thus seals the lower end of the container 12 against product escape. The actuator 92 is reciprocated several times to create a vacuum within the pump chamber 100 which draws the product through the container 12 through the hole 28 into the pump chamber 100. After the product fills the pump chamber 100, downward movement of the actuator 92 results in like movement of the pump piston 96 which assures the sealing of the hole 28 by the valve element 44 followed by the flow of the product from within the pump chamber 100 out through the outlet 56, through the passage 60 and into the duct 50, moving the outlet valve element 62 to an open position as shown in FIG. 5. After the duct 50 and the duct extension 82 fill, actuation of the piston 96 will result in a pumping action as shown in FIG. 5. When the actuator 92 is released, the spring 102 will move the actuator 92 and the piston 96 upwardly, causing a partial vacuum to be drawn within the pump chamber 100 which automatically results in the closing of the inlet opening 54 by the valve element 62 and the opening of the hole 28 by upward movement of the valve element 44 and the flow of the product 104 into the pump chamber 100 as shown in FIG. 2. It is to be understood that a partial vacuum having been drawn in the pump chamber 100, atmospheric pressure on the piston 14 will move the piston 14 upwardly into the container 12 so that internal and external pressure differential through the piston 14 will result in product flow through the hole 28 to fill the pump chamber 100 for the next pumping operation.

Figure 6:
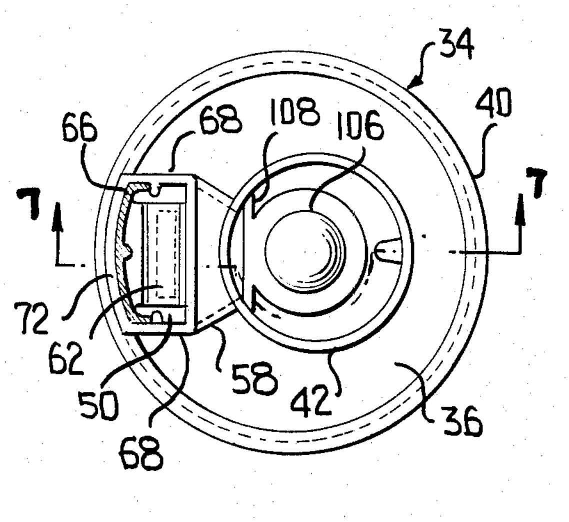
FIG. 6 is a transverse sectional view similar to FIG. 4, and shows a modified form of inlet valve element.
Figure 7:
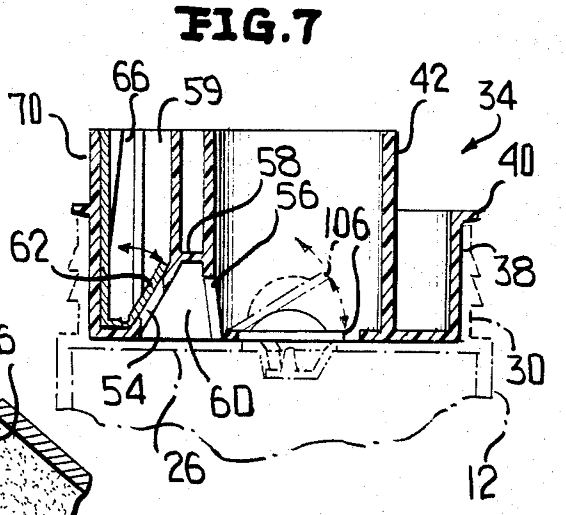
FIG. 7 is a fragmentary longitudinal sectional view taken generally along the line 7—7 of FIG. 6, and shows the details of the modified inlet valve element in its relationship to the container.

If desired, in lieu of the specific inlet valve element 44 carried by the resilient arms 46, 48, the inlet valve element may be in the form of the valve element 106 of FIGS. 6 and 7. The valve element 106 is in the form of a flap valve which is hingedly connected to the pump cylinder 42 by a hinge arm 108, as is best shown in FIG. 6. Instead of moving longitudinally only, as in the case of the valve element 44, the valve element 106 hinges or pivots as shown in FIG. 7. The valve element 106 is also preferably of a centrally arched configuration for stiffness.

Figure 8:
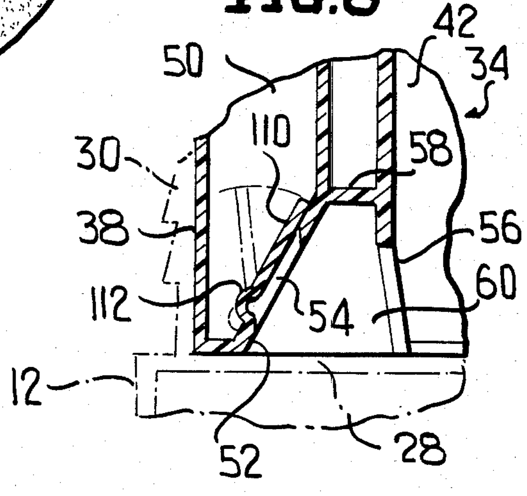
FIG. 8 is an enlarged fragmentary sectional view through a modified form of insert wherein the outlet valve element is integrally formed with the insert.

Reference is now made to FIG. 8 wherein it will be seen that the outlet valve element, in lieu of being part of a separately formed insert as in the case of the outlet valve element 62, is in the form of a flap valve outlet valve element 110 which is integrally connected to the wall 52 by a hinge component 112 in position for closing the outlet opening 54.

It is to be understood that the function of the dispenser 10 when modified either by way of incorporating the valve element 106 or the valve element 110 or both, is the same as described above with respect to the embodiment of FIGS. 1–5.

Although only several preferred embodiments of the dispenser have been specifically illustrated and described herein, it is to be understood that minor variations may be made in the dispenser and the constructional details thereof without departing from the spirit and scope of the invention as defined by the appended claims.

What is claimed is:

1. An insert for mounting on a dispensing container beneath a separate head member, said insert comprising a base, walls extending from said base in a direction normal to said base and defining a pump chamber and a dispensing duct, said pump chamber and dispensing duct being open at their ends remote said base to permit a piston carried by said head member to be introduced into said pump chamber through its open end and to permit a discharge passage in said head member to be coupled to said dispensing duct, an outlet opening in said pump chamber and an inlet opening in said duct adjacent said base and in communication with each other for transferring a flowable product from said pump chamber to said duct, an inlet flow control valve carried by said insert for controlling product flow into said pump chamber from an opening in said container, and a back flow control valve in said duct for preventing back flow of a flowable product from said duct towards said pump chamber.

2. An insert according to claim 1 wherein said back flow control valve is a separately formed element.

3. An insert according to claim 1 wherein said back flow control valve is a separately formed element and is hingedly connected to a support extending longitudinally of said duct.

4. An insert according to claim 1 wherein said back flow control valve is a separately formed element and is hingedly connected to a support extending longitudinally of said duct and generally forming a wall of said duct.

5. An insert according to claim 1 wherein said pump chamber has an open bottom, and said inlet flow control valve is located near said pump chamber bottom and is integrally connected to the remainder of said insert.

6. An insert according to claim 5 wherein said inlet flow control valve is a flap valve extending from said pump chamber.

7. An insert according to claim 1 wherein said pump chamber has an open bottom, and said inlet flow control valve is located near said pump chamber bottom and is integrally connected to the remainder of said insert by a pair of arms joined to said pump chamber.

8. An insert according to claim 1 wherein said pump chamber has an open bottom, and said inlet flow control valve is located near said pump chamber bottom and is integrally connected to the remainder of said insert by a pair of arms joined to said pump chamber at said base.

9. An insert according to claim 1 wherein said duct inlet opening is disposed in a wall which slopes relative to the longitudinal.

10. An insert according to claim 1 wherein said duct inlet opening is disposed in a wall which slopes relative to the longitudinal and said back flow control valve is a flap which directly overlies said duct inlet opening wall.

11. An insert according to claim 1 wherein said pump chamber is in the form of a pump cylinder.

12. A dispenser for paste-like materials, said dispenser comprising a container having near one end a transverse wall having a hole therethrough for the passage of a product, a head member coupled to said container at said one end and having a discharge passage, an insert within said head member at said container one end, said insert comprising a base, a pump chamber and a dispensing duct projecting from said base, an outlet opening in said pump chamber and an inlet opening in said duct adjacent said base and in communication with each other for transferring a flowable product from said pump cylinder to said duct, an inlet flow control valve carried by said insert for controlling product flow into said pump chamber, and a back flow control valve in said duct for preventing back flow of a flowable product from said duct towards said pump chamber, said pump chamber being sealed to said transverse wall around said hole for receiving a product from said container, said inlet flow control valve being operative to close product back flow from said pump chamber through said hole, said duct being connected to said head member discharge passage, a pump member cooperating with said pump chamber, and an actuator for said pump member carried by said head member.

13. A dispenser according to claim 12 wherein said pump chamber is defined by a pump cylinder, and said pump member is in the form of a piston.

14. A dispenser according to claim 12 wherein there is a flow passage between said pump chamber outlet opening and said duct inlet opening, said flow passage being in part formed by said insert and in part by said transverse wall.

15. A dispenser according to claim 12 wherein said insert includes a tubular body extending from said base and surrounding said pump chamber and said base, said container having a tubular extension extending longitudinally beyond said transverse wall, and said tubular body being telescoped within said container tubular extension with said base opposing said transverse wall.

16. A dispenser according to claim 15 wherein said container tubular extension is telescoped within said head member.

17. A dispenser for paste-like products comprising a container having opposite ends which are spaced apart in a longitudinal direction and one of which is substantially closed by a transverse wall wherein there is a hole, a head member on said one end of the container having an actuation member that is manually inwardly displaceable against a bias, a pump chamber being within said head member, an outlet in said head member and spaced from said hole, a slidable piston sealingly engaging the inner surface of the container to close its other end, a pair of check valve elements, one check valve element being arranged to prevent flow of product through said hole from the pump chamber back into the container and the other check valve element arranged to prevent inward flow through said outlet towards the pump chamber, said dispenser being characterized by: an insert member arranged between said head member and said transverse wall and comprising a cylindrical wall and a pump piston slidably arranged in said cylindrical wall, said pump piston being connected to said displaceable actuation member for actuation thereby, the insert further locating the first check valve element for closing said hole in said transverse wall and having a passage in said cylindrical wall connecting the pump chamber with an outlet duct leading to said outlet in the head member, and said second check valve element being arranged in said outlet duct.

18. A dispenser according to claim 17 wherein a portion of said outlet duct disposed adjacent said container is an integral part of said insert.

19. A dispenser according to claim 17 wherein said second check valve element is integrally connected to said insert.

20. A dispenser according to claim 17 wherein said second check valve element is integrally connected to a second insert seated in aid outlet duct.

21. A dispenser according to claim 17 wherein said second check valve element is a flap valve integrally hinged to said pump chamber adjacent said transverse wall.

22. A dispenser according to claim 17 wherein said first check valve element is a rigid valve member carried by integral spring-like arms.

23. An insert for a dispensing container, said insert comprising a base, a pump chamber and a dispensing duct projecting from said base, an outlet opening in said pump chamber and an inlet opening in said duct adjacent said base and in communication with each other for transferring a flowable product from said pump chamber to said duct, an inlet flow control valve carried by said insert for controlling product flow into said pump chamber, and a back flow control valve in said duct for preventing back flow of a flowable product from said duct towards said pump chamber, said pump chamber having an open bottom, and said inlet flow control valve being located near said pump chamber bottom and being integrally connected to the remainder of said insert by a pair of arms joined to said pump chamber, said arms being arcuate in plan and elongated whereby movement of said inlet flow control valve is substantially longitudinal.

* * * * *